United States Patent [19]
Penninckx

[11] Patent Number: 5,999,297
[45] Date of Patent: Dec. 7, 1999

[54] METHOD OF PUTTING BINARY DATA ON AN OPTICAL CARRIER WAVE, AND A TRANSMISSION SYSTEM USING THE METHOD

[75] Inventor: Denis Penninckx, Montlhery, France

[73] Assignee: Alcatel N.V., Rijswijk, Netherlands

[21] Appl. No.: 08/651,680

[22] Filed: May 21, 1996

[30] Foreign Application Priority Data

May 24, 1995 [FR] France .................................. 95 06237

[51] Int. Cl.[6] .......................... H04B 10/00; H04B 10/04; G02F 1/03; G02F 1/035
[52] U.S. Cl. .......................... 359/154; 359/181; 359/182; 359/248; 385/3; 385/10
[58] Field of Search .................. 359/154, 124, 359/181, 187, 182; 385/3

[56] References Cited

U.S. PATENT DOCUMENTS

| | | | |
|---|---|---|---|
| 4,979,185 | 12/1990 | Bryans et al. | 375/20 |
| 5,144,469 | 9/1992 | Brahms et al. | 359/181 |
| 5,611,003 | 3/1997 | Lesterlin | 385/3 |
| 5,706,117 | 1/1998 | Imai et al. | 359/187 |

OTHER PUBLICATIONS

A. J. Price et al, "Reduced bandwidth optical digital intensity modulation with improved chromatic dispersion tolerance," *Electronics Letters*, vol. 31, No. 1, Jan. 5, 1995, Stenvenage GB, pp. 58–59.

Toshiyuki Itoh et al, "Coded Continuous Phase Modulation Combined with Nonuniform Mapping and Multi–H Scheme", *IEEE Global Telecommunications Conference & Exhibition, Hollywood,* Nov. 28–Dec. 1988, vol. 2 of 3, No. 27.5, Nov. 28, 1988—Institute of Electronics Engineers, pp. 865–869.

*Primary Examiner*—Jason Chan
*Assistant Examiner*—Mohammad Sedighian
*Attorney, Agent, or Firm*—Sughrue, Mion, Zinn, Macpeak & Seas, PLLC

[57] ABSTRACT

In a transmission system, a control circuit (4) receives an input binary sequence (T) representing data to be transmitted. The circuit encodes the sequence using a phase alternation code which differs from the phase inversion duobinary code in that the phase shifts applied to a carrier wave are less than 90 degrees. For this purpose, a semiconductor chip (3) includes a laser transmitter and an electro-absorption modulator having two segments. The chip generates said carrier wave and modulates it using the encoded sequence. An optical fiber (54) conveys the modulated wave. And a detector diode (58) receives the conveyed wave and performs intensity discrimination thereon so as to restore the input binary sequence.

9 Claims, 2 Drawing Sheets

METHOD OF PUTTING BINARY DATA ON AN OPTICAL CARRIER WAVE, AND A TRANSMISSION SYSTEM USING THE METHOD

FIELD OF THE INVENTION

The present invention relates to transmitting data by modulating a carrier wave. The term "wave" is used herein to designate any oscillatory phenomenon propagating along a wire, in a waveguide, or through empty space, for example. The invention applies in particular to the case when the carrier wave is a light wave guided by an optical fiber.

BACKGROUND OF THE INVENTION

In systems providing such transmission, it is desirable to reduce the spectrum width of the signal, i.e. the spectrum bandwidth occupied by the signal to be transmitted, to as narrow a width as possible without increasing the transmission error rate to a problematic extent. In particular, reduced spectrum width can make it possible to increase the number of transmission spectrum channels carried by the same wave.

A known "duobinary" encoding method can be used to achieve the above-mentioned reduction. It is particularly applicable to transmission systems in which the carrier wave is a light wave guided by an optical fiber.

In that case, reducing the spectrum bandwidth of the signal is especially desirable because optical fibers often exhibit chromatic dispersion and because such dispersion deforms the transmitted signal, which deformation increases with increasing signal spectrum width, and thus increases the error rate.

An improved example of that encoding method has been proposed, and it is particularly advantageous when the carrier wave is a light wave guided by an optical fiber because it enables the intensity of the carrier wave to be given two values only. That improved example may be referred to as "phase inversion duobinary" encoding. It causes the carrier wave to have an intensity and a phase that are substantially constant during each of the groups of zero bits or of one bits making up the input signal, each group of zero bits extending between two one bits and being constituted by at least one zero bit and no one bits, and each group of one bits extending between two zero bits and being constituted by at least one one bit and no zero bits. Said intensity is equal to a nominal intensity during the groups of one bits. During the groups of zero bits, it is equal to the quotient of the nominal intensity divided by an extinction ratio TX which it is desirable to make as large as possible. Said phase constitutes a reference phase during the groups of zero bits, and it has a phase shift relative to the reference phase during the groups of one bits. This shift is associated with the group. The sign of shift is reversed between two consecutive groups of one bits when and only when the group of zero bits separating the two groups of one bits comprises an odd number of bits. And its amplitude is set so as to be equal to about 90 degrees.

This set value is inherent to the code. According to the known theory that was used to develop the code, when two consecutive groups of one bits are separated from each other by an odd number of bit periods, the looked-for reduction in the spectrum width of the signal is obtained and results from the combination of two facts. The first fact is that, during the two groups of one bits, a modulation factor affecting the field of the carrier wave has two mutually symmetrical values such as 1 and −1. The second fact is that a cumulative phase shift of 2×90=180 degrees of the carrier wave between the two groups makes it possible to give two such symmetrical values to the modulation factor while giving the same value to the intensity of the carrier wave throughout all of the groups of one bits.

The phase inversion duobinary code is described in an article entitled "Reduced bandwidth optical digital intensity modulation with improved chromatic dispersion tolerance", A. J. Price et al., IEEE Electronics Letters, Vol. 31, No. 1, pages 58–59, January 1995).

In known manner, it requires a modulator to be used that satisfies two conditions. The first condition is that the modulator makes it possible to achieve an extinction ratio that is high enough for the intensity of the carrier wave to be considered as being zero during the groups of zero bits.

The second condition is that the modulator is suitable for performing the cumulative phase shift of 180° that the code requires in certain cases between two consecutive groups of one bits.

In the optical field, a type of modulator is known that satisfies both conditions: it is the Mach-Zehnder type of interferometric modulator. That type of known modulator suffers from the drawbacks of ageing quickly, of being costly, bulky, and/or difficult to integrate with other optical components required in a transmission system.

BRIEF SUMMARY OF THE INVENTION

An object of the present invention is to make it possible, in an optical transmission system, to reduce the spectrum width of the signal while giving the intensity of the carrier wave two values only, and while using a modulator that is cheap, compact, and/or easy to integrate with other components.

More generally, an object of the present invention is to make it possible to obtain a reduction in the spectrum width of a signal to be transmitted on a carrier wave, while giving the intensity of the wave two values only and while using a modulator that satisfies conditions that are less strict than those required by the prior art.

The method of the invention is characterized by the fact that said phase shifts associated with the groups of one bits are set so as to impart a value of less than 90 degrees to a nominal phase shift constituted by a mean absolute value of the phase shifts. Typically, this value may be less than 75 degrees. The code of the invention may be referred to as a "phase alternation code".

In a typical implementation, the intensity of the carrier wave is equal to the nominal intensity during each of the one bits, and all of the absolute values of said phase shifts are equal to the nominal phase shift.

The nominal phase shift and the extinction ratio are related to each other.

A optimum value for the phase shift may be defined by the extinction ratio using a relationship indicated below. This relationship expresses the fact that the spectrum width of the signal is at its minimum, and the relationship may be referred to as a "minimum spectrum width relationship". In this relationship, the smaller the extinction ratio, the smaller the optimum value, i.e. the optimum value is an increasing function of the ratio. If possible, the nominal phase shift is preferably chosen in the vicinity of the optimum value.

In the event that the maximum value for the phase shift that can be achieved by the available modulator is less than the optimum value defined by the maximum extinction ratio possible with said modulator, the maximum value for the phase shift is adopted, and the effective extinction ratio is chosen by taking into account the maximum phase-shift value. In certain cases, the effective extinction ratio may be chosen in the vicinity of the value which is associated with the maximum phase-shift value by means of the minimum spectrum width relationship. Since the value associated with the extinction ratio is an increasing function of the nominal phase shift, the extinction ratio chosen may then be smaller than the maximum extinction ratio made possible by the modulator, which corresponds to a minimum value for the spectrum width of the signal to be transmitted. However, two facts must be taken into account: one is that any reduction in the extinction ratio tends to increase the error rate. The other fact is that, the lower the extinction ratio, the higher the accuracy required for the phase shift giving a minimum spectrum width. That is why, it may then be preferable to choose an extinction ratio that is greater than the associated value.

It appears from the above that, in various cases, the nominal phase shift DP is preferably set to a value of not more than the value defined by the minimum spectrum width relationship. This relationship may be written as follows: DPM=ArccosTX$^{-\frac{1}{2}}$
where DPM represents designates said optimum value or said maximum value for the nominal phase shift, and where TX represents said effective value or said associated value for the extinction ratio.

Although it is indicated above that, typically, the intensity of the carrier wave is equal to the nominal intensity during all of the groups of one bits, and that the phase shifts are in absolute values, each of which is equal to the nominal phase shift, it should be understood that the present invention can be applied advantageously to different cases.

To illustrate various possibilities for implementing the invention, consideration may be given, for example, to the case when data to be transmitted on an optical carrier wave can be represented by a binary sequence as follows:
"001111010110010001 . . ."

Transformation using the known phase inversion duobinary code gives:
"00++++0−0++00++000−. . ."
where "+" and "−" represent the presence of a maximum light intensity with respective phases φ and φ+180°, i.e. +1 and −1.

In the same way as that known encoding method, the encoding method of the invention gives a sequence of the following form:
"ZZaaaaZbZaaZZaZZzb . . ."

But, according to the invention, Z, a, and b are considered to be complex numbers, each of which defines not only an amplitude given an algebraic sign, but also a phase that can take continuously adjustable values.

Any encoding of this type leads to multiplication of the spectrum density by a factor of 1+m.cos(2πfT), where f designates the frequency, T designates the bit period, and m designates a spectrum modulation index.

The value of the index is given by the following equation:

$$m = \frac{2\alpha^2 + 2\beta^2 - 4\alpha\beta\cos(\Phi_a - \Phi_b)}{4 + 3\alpha^2 + 3\beta^2 - 4\alpha\cos\Phi_a - 4\beta\cos\Phi_b - 2\alpha\beta\cos(\Phi_a - \Phi_b)}$$

where a/Z=αe$^{i\Phi_a}$
and b/Z=βe$^{i\Phi_b}$

Since the index m varies between 0 and 1, the values closest to 1 correspond to the minimum spectrum width of the signal, i.e. the minimum spectrum width relationship indicated above in a more specific case is equivalent to m=1.

The phase inversion duobinary code is obtained for $\Phi_a - \Phi_b$ equal to 180°, and α and β infinite. It gives m=1. Multiplying the spectrum density by 1+cos(2πfT) is equivalent, for an NRZ signal, to dividing the spectrum width by 2. The spectrum includes no line at the mean wavelength because the mean of the signal is zero.

The above-mentioned typical implementation corresponds to the case when $\Phi_a = -\Phi_b = $DP and α=β. In which case m is given as follows:

$$m = \frac{2TX \cdot (1 - \cos 2DP)}{2 + 3TX - 4TX^{1/2} \cdot \cos DP - TX \cdot \cos 2DP}$$

Under the invention, it can therefore by shown that, for all values of the extinction ratio TX=α$^2$, there exists a phase shift DP=DPM ArcCos(TX$^{-\frac{1}{2}}$), less than 90 degrees, such that m is equal to 1. The existence and the value of the phase shift establish the above-mentioned minimum spectrum width relationship. Under these conditions, and according to the present invention, it is possible to use a relatively small extinction ratio to perform phase shifts that are themselves relatively small. Such an extinction ratio may be that of a known type of electro-absorption modulator (TX in the vicinity of 10) which is cheap and compact.

So long as the modulation index m is equal to 1, the spectrum of the signal obtained by the encoding of the invention differs from that obtained by means of known phase inversion duobinary encoding only in that it includes a line at the carrier wavelength.

It may however be advantageous to reduce still further the nominal phase shift by accepting a spectrum modulation index that is less than 1, i.e. by accepting a certain increase in the spectrum width of the signal. A modulation index of $\frac{2}{3}$ is sufficient to compress the spectrum considerably. A phase shift DP of about 45°–50° then often appears to be sufficient for an extinction ratio of 10.

But other values for $\Phi_a$, $\Phi_b$, α, and β may be taken so as to obtain a value for m that is large enough, i.e. that is greater than about 0.66.

An implementation of the present invention is described in more detail below by way of non-limiting example and with reference to the accompanying diagrammatic figures. When the same element is shown in more than one figure, it is designated by the same reference.

DETAILED DESCRIPTION OF THE INVENTION

Figure 1:
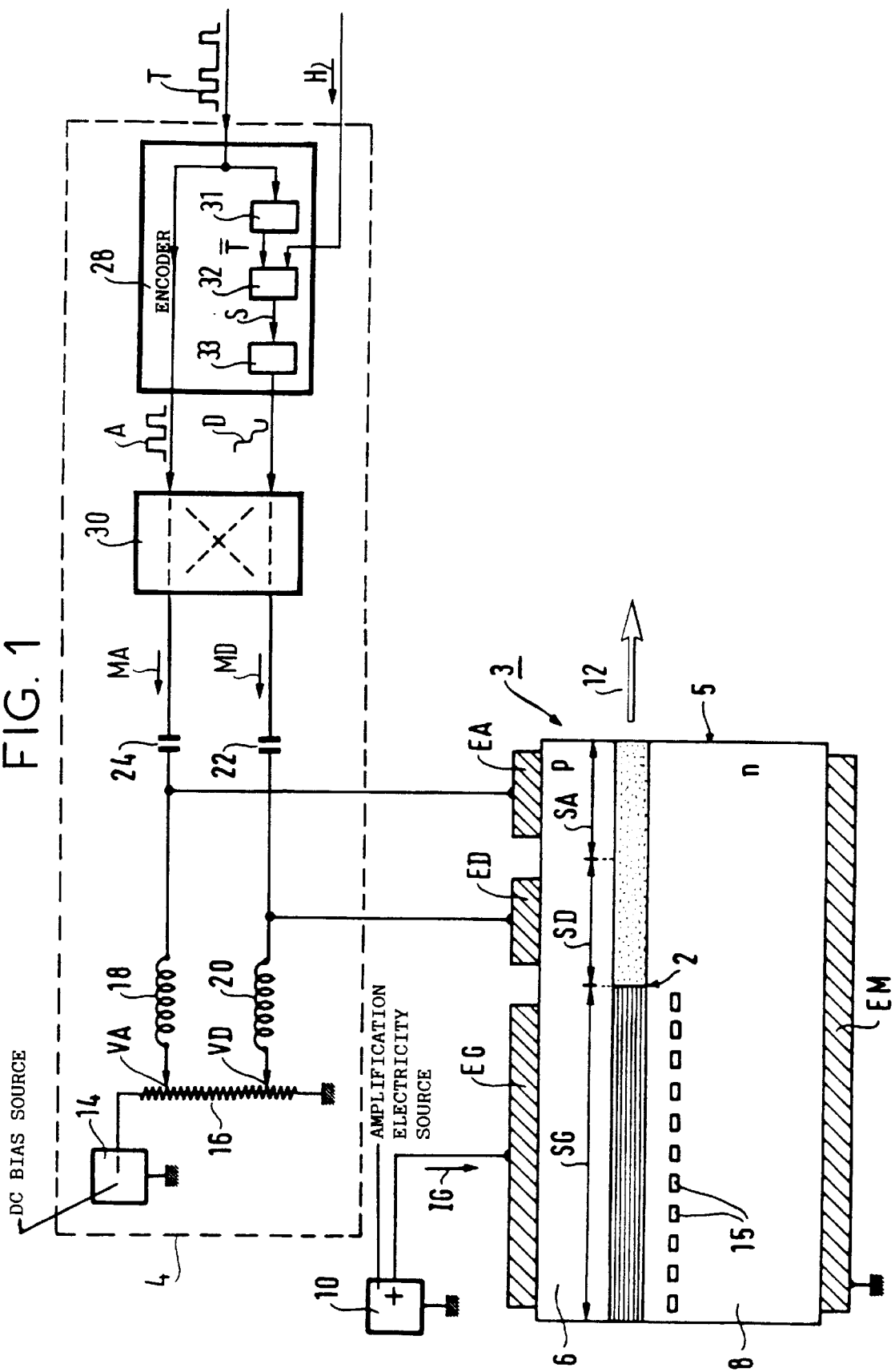
FIG. 1 shows a view of a light modulator that can be used to implement the method of the invention, with a semiconductor chip of the modulator being shown in longitudinal section.

The modulator is an electro-optical semiconductor modulator. It includes the following elements:

A light guide 2 suitable for guiding a light wave in a longitudinal direction, and outputting it at the end of the guide in the form of an output wave 12 carrying modulation. The guide is formed in a semiconductor chip 3, and the end in question is formed by an end face of the chip. The end face slopes and/or carries an anti-reflective covering so as to enable the light wave to be output. The guide 2 has an electro-optical effect suitable for modulating the output wave.

An attenuation electrode EA, a phase shift electrode ED, and a common electrode EM, which electrodes are disposed facing the guide.

A control circuit 4 suitable for receiving an input signal T, and responding by supplying the electrodes with variable control voltages creating electric fields in the guide 2 so as to modulate the output wave 12.

The guide 2 includes in particular two segments extending and succeeding each other in the longitudinal direction, namely an attenuation segment SA facing the electrode EA, and a phase shift segment SD facing the electrode ED. Each of the two segments has an attenuation electrical sensitivity dCA/dV1 equal to the ratio of a variation dCA in the mean coefficient of absorption CA of the segment divided by a variation dV1 in the control voltage V1 that caused the variation in the coefficient. Each of the two segments secondly also has a phase shift electrical sensitivity dΦ/dV2 equal to the ratio of the variation dΦ in a phase shift angle φ divided by a variation dV2 in the control voltage V2 that caused the variation in the angle. The angle φ is a function of the mean refractive index of the segment.

The relationship between the attenuation electrical sensitivity and the phase shift electrical sensitivity of each segment is expressed by a phase amplitude coupling factor a defined by the following equation:

$$\frac{d\phi}{dt} = \frac{\alpha}{2} \frac{1}{CA} \frac{dCA}{dt}$$

where t represents time.

The factor a is specific to the segment. It is smaller in the attenuation segment SA than in the phase shift segment SD.

The attenuation segments EA and ED make it possible to apply different respective control voltages to the two segments SA and SD, which control voltages respectively constitute an attenuation segment control voltage and a phase shift segment control voltage. Each of the voltages has a DC component and an AC component.

The control circuit 4 receives an input signal T defining firstly a reference attenuation A representative of an attenuation variation to be applied to said output wave, and secondly a reference phase shift D representative of an optical phase shift variation to be applied to the wave. The control circuit responds by supplying the AC component of the control voltage MA of the attenuation segment in the form of a first combination, e.g. a linear combination:

MA=k1A+k2D of the reference attenuation and of the reference phase shift. It also supplies the AC component of the control voltage MD of the phase shift segment in the form of a second combination:

MD=k3A+k4D of the reference attenuation and of the reference phase shift. For example, the second combination may also be linear, but it is different from the first combination. The coefficients k1, k2, k3, and k4 are substantially constant. The ratio k1/k2 must be different from the ratio k3/k4.

Finally, the circuit 4 supplies the DC components VA, VD of the control voltages of the attenuation segment and of the phase shift segment.

The attenuation segment SA and the phase shift segment SD are constituted by multiple quantum well semiconductor structures.

The light guide 2 is formed in the chip 3 between two confinement layers 6, 8 having opposite conductivity types p and n. It further includes an amplification segment SG contained in a resonant optical cavity and made of a material suitable for becoming optically amplifying under the action of an injection current IG flowing in a forward direction between the two confinement layers. The resonant cavity is constituted by a distributed Bragg reflector 15 coupled to the guide 2.

An amplification electrode EG is disposed facing the amplification segment SG. The amplification electrode and the common electrode EM are powered by an amplification electricity source 10 so as to cause the injection current to flow in the forward direction between the two confinement layers. The amplification segment then constitutes a DFB laser integrated in the modulator for generating a light wave in the guide 2.

The control circuit 4 supplies the DC components VA, VD of the control voltages of the attenuation segment and of the phase shift segment so as to prevent a current from flowing between the two confinement layers 6 and 8. Such a current is prevented from flowing either if such a control voltage has a backward direction opposite from said forward direction, or if the voltage has the forward direction but has a value lower than a limit dependent on the doping of the layers.

In a disposition facilitating implementation of the modulator, the attenuation segment SA and the phase shift segment SD have identical structures. This gives them electrical sensitivities that are equal when they are subjected to variable control voltages that remain mutually equal. However, given the choice of the semiconductor structure common to both of the segments, the sensitivities depend to a large extent on the DC components VA and VD of the control voltages. The control generator 4 then gives the two DC components VA, VD two different values so as to give the phase amplitude coupling factor a value that is significantly smaller in the attenuation segment SA than in the phase shift segment SD.

The DC components VA and VD of the control voltages of the attenuation segment and of the phase shift segment are supplied to the electrodes EA and ED by a DC bias source 14 via a resistive divider 16 and via separation inductors 18 and 20.

The AC components MA and MD of the control voltages are respectively supplied to the same electrodes EA and ED via separation capacitors 22 and 24, by a combiner circuit 30 which forms the two above-mentioned linear combinations, thereby constituting the two AC components MA and MD.

Figure 2:
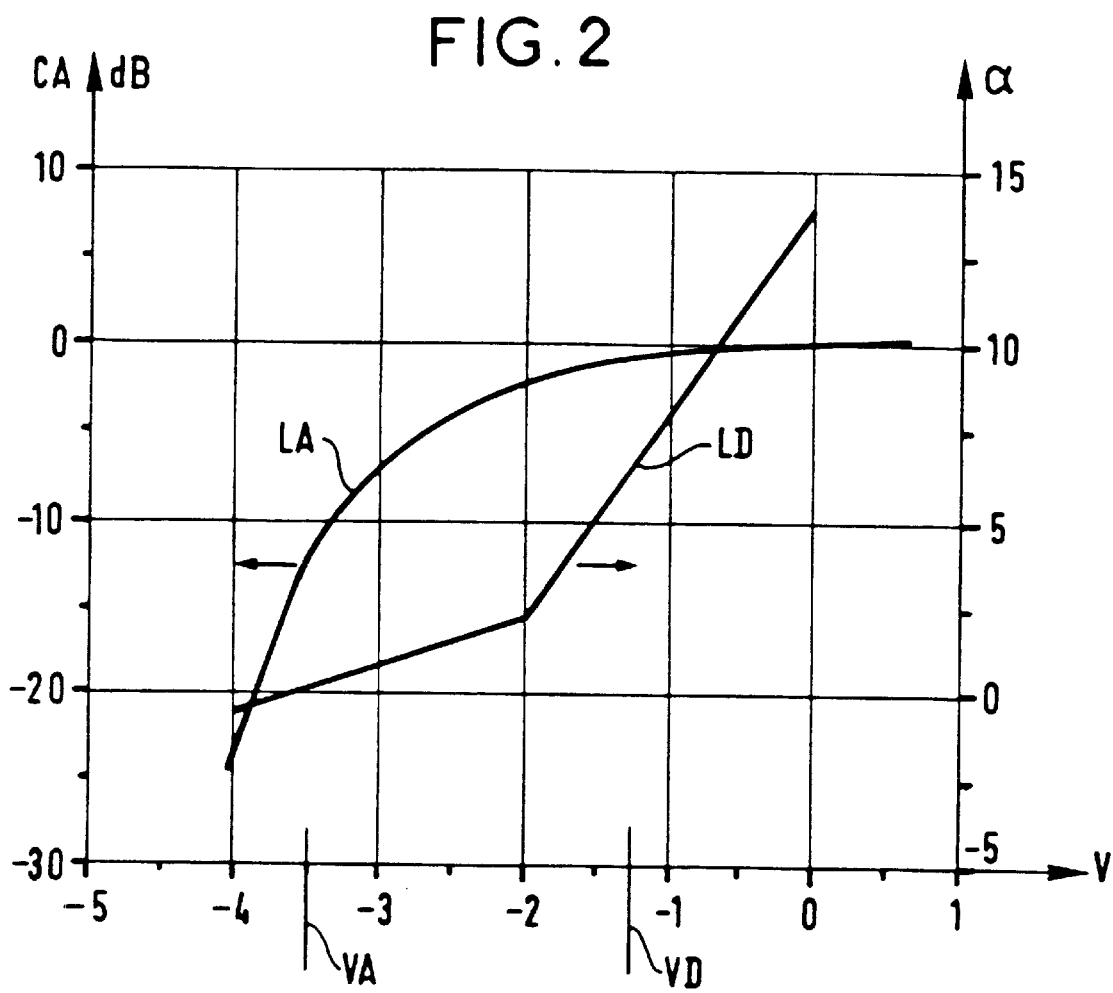
FIG. 2 is a graph of variations in an attenuation and a phase shift that are applied to a carrier wave by the modulator of FIG. 1, voltages applied to perform the attenuation and the phase shift being plotted along the x-axis.

The choice of the DC components VA and VD appears in FIG. 2, in which the graphs LA and LD respectively represent the variations in the coefficient of absorption CA and in the phase-amplitude coupling factor a, which factor defines the phase shift, each variation being a function of the voltage applied between the specific corresponding electrode EA or ED and the common electrode EM. The voltages are shown as being negative because they reverse bias the diode formed by the confinement layers 6 and 8. The voltage VA procures a larger attenuation electrical sensitivity and a smaller phase shift electrical sensitivity than the voltage VD.

The graphs correspond to the choices described above, in a case when the light selected by the Bragg reflector 15 has a wavelength of 1,550 nm.

The reference attenuation A and the reference phase shift D are supplied by an encoder 28 which receives the binary input sequence T representative of the data to be transmitted.

The encoder applies the phase alternation code of the invention to the sequence. It allows the sequence T to pass through without being modified so as to constitute the reference attenuation A. In order to constitute the reference phase shift D, it firstly transforms the sequence T into an electrical duobinary signal. This duobinary signal may be created by forming the complementary sequence T̄ of the sequence T in a circuit 31. The complementary sequence T̄ then passes through a bistable 32 of the flip-flop type which is regulated by the clock H of the signal T, and which changes state so as to form an output signal S when a one bit arrives at its input. At the output of the bistable, a filter 33 transforms the signal S into a duobinary-type three-level signal which constitutes the reference phase shift D. The filter must come as close as possible to the transfer function:

$$H(fo) = \frac{1}{2}[1 + \cos 2\pi fT] \text{ for } |fo| \leq \frac{1}{2T} H(f) = 0 \text{ elsewhere}$$

where T is the bit time and f is the frequency

For example, a fifth order Bessel filter may be used having a passband of 2.8 GHz for a data rate of 10 Gbit/s. This technique is described in the article entitled "The Duobinary Technique for High-Speed Data Transmission" by A. Lender, IEEE Trans. on Comm. Elec. vol 82, pages 214–218, May, 1963.

The coefficient k4 is set so as to obtain the phase shift DP defined by the phase alternation code of the invention. The coefficient k1 is set so that the extinction ratio TX is as large as possible. The coefficients k2 and k3 are adjusted so as to obtain a phase modulation and an amplitude modulation that are as pure as possible.

Figure 3:
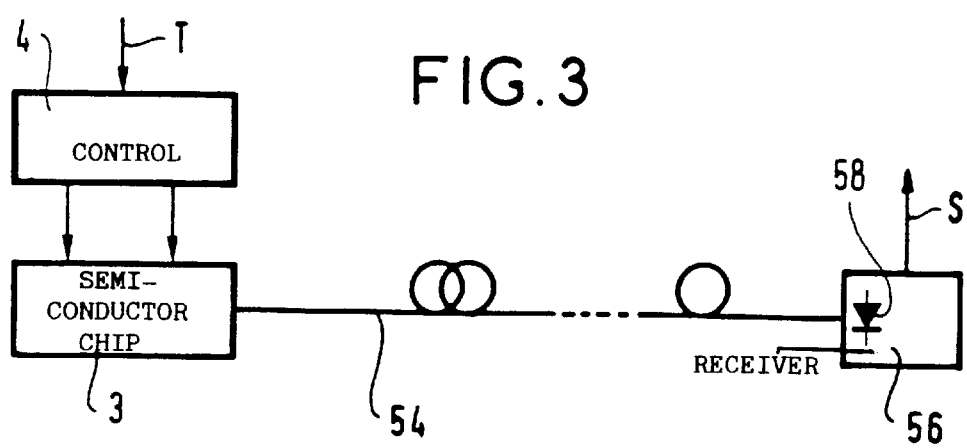
FIG. 3 shows a view of a data transmission system of the invention, which system includes the modulator shown in FIG. 1.

As shown in FIG. 3, the transmission system of the present invention comprises:

the circuit 4 receiving the input sequence T;

the chip 3 supplying the modulated carrier wave carrying the encoded data, the assembly comprising the circuit 4 and the chip 3 constituting an encoder-transmitter;

an optical fiber transmission line 54 receiving and guiding the modulated carrier wave, which line has chromatic dispersion that can cause distortion of the signal modulating the wave; and a receiver 56 receiving the carrier wave at the output of the link and responding by supplying an output signal S, which output signal restores the data to be transmitted with an error rate that is increased by the dispersion of the line 54, but that is however limited by the narrow spectrum width of the modulated carrier wave. The input of the receiver is constituted by a photodiode 58 which discriminates between the intensities of the carrier wave so as to reproduce the input binary sequence T.

I claim:

1. A method of putting binary data on an optical carrier wave, in which said method an input signal is encoded using a code for modulating an optical carrier wave, the input signal being clocked to a bit period and being in the form of an alternating succession of groups of zero bits and of groups of one bits, each group of zero bits extending between two one bits and being constituted by at least one zero bit and no one bits, and each group of one bits extending between two zero bits and being constituted by at least one one bit and no zero bits;

the code causing the carrier wave to have an intensity and a phase that are substantially constant during each of said groups of bits, said intensity being equal, at least on average, to a nominal intensity during the groups of one bits and being equal, at least on average, to the quotient of the nominal intensity divided by an extinction ratio (TX) during the groups of zero bits, said phase constituting a reference phase during the groups of zero bits, and having a phase shift relative to the reference phase during each group of one bits, which shift is associated with the group, the signs of the shifts associated with two consecutive groups of one bits being mutually opposite when and only when the group of zero bits separating the two groups of one bits comprises an odd number of bits;

said method being characterized by the fact that said phase shifts associated with the groups of one bits are set so as to impart a value of less than 90 degrees to a nominal phase shift (DP) constituted by a mean absolute value of the phase shifts.

2. A method according to claim 1, characterized by the fact that the nominal phase shift (DP) is less than 75 degrees.

3. A method according to claim 1, characterized by the fact that the nominal phase shift (DP) is set to a value of not more than:

DPM=ArccosTX$^{-\frac{1}{2}}$ where TX designates said extinction ratio.

4. A method according to claim 1, characterized by the fact that the phase shift (DP) is set so as to impart a value greater than 0.66 to a spectrum modulation index:

$$m = \frac{2TX \cdot (1 - \cos 2DP)}{2 + 3TX - 4TX^{1/2} \cdot \cos DP - TX \cdot \cos 2DP}$$

5. A system for transmitting data on an optical carrier wave, the system including:

an encoder-transmitter (3, 4) for receiving data to be transmitted that can be represented by a clocked succession of zero bits and of one bits constituting an input sequence (T), which sequence is in the form of an alternating succession of groups of zero bits and of groups of one bits, each group comprising at least one bit, the encoder-transmitter responding by supplying said optical carrier wave having a modulation defined by the encoder-transmitter on the basis of the input sequence and using a code;

the code causing said optical carrier wave to have an intensity and a phase that are substantially constant during each of said groups of bits of the input sequence, said intensity being equal, at least on average, to a nominal intensity during the groups of one bits and being equal, at least on average, to the quotient of the nominal intensity divided by an extinction ratio (TX) during the groups of zero bits, said phase constituting a reference phase during the groups of zero bits, and being affected by a phase shift relative to the reference phase during each group of one bits, the sign of the shift being reversed between two consecutive groups of one bits when and only when the group of zero bits separating the two groups of one bits comprises an odd number of bits; and a receiver (56) situated at a distance from the encoder-transmitter, and receiving said carrier wave having said modulation, the receiver reproducing said input sequence by carrier wave intensity discrimination;

said system being characterized by the fact that said encoder-transmitter sets a nominal phase shift (DP) to a value of less than 90 degrees, the nominal phase shift being a mean absolute value of said phase shifts.

6. Apparatus according to claim 5, characterized by the fact that the nominal phase shift (DP) is less than 75 degrees.

7. Apparatus according to claim 5, characterized by the fact that the nominal phase shift (DP) is set to a value of not more than:

DPM=ArccosTX$^{-1/2}$ where TX designates said extinction ratio.

8. A system according to claim 5, characterized by the fact that the phase shift (DP) is set so as to impart a value greater than 0.66 to a spectrum modulation index $$m = \frac{2TX \cdot (1 - \cos 2DP)}{2 + 3TX - 4TX^{1/2} \cdot \cos DP - TX \cdot \cos 2DP}$$

where TX designates said extinction ratio.

9. A system according to claim 6, characterized by the fact that said encoder-transmitter includes:

a light source (SG) for supplying said carrier wave;

an encoder (28) for receiving said input sequence (T) and for supplying a reference phase (D) and a reference attenuation (A) for the wave;

a combiner circuit (30) performing two distinct combinations of said reference attenuation and of said reference phase; and an electro-absorption modulator comprising two segments (SD, SA) controlled respectively by said two combinations so as to impart said constant intensity and said constant phase to said optical wave during each of said input groups of bits.

* * * * *